United States Patent
Graff et al.

(10) Patent No.: US 9,346,120 B1
(45) Date of Patent: May 24, 2016

(54) SONOTRODE APPARATUS FOR USE IN ULTRASONIC ADDITIVE MANUFACTURING

(71) Applicant: EDISON WELDING INSTITUTE, INC., Columbus, OH (US)

(72) Inventors: Karl F. Graff, Hilliard, OH (US); Cameron Benedict, Orient, OH (US); Justin Wenning, Celina, OH (US)

(73) Assignee: EDISON WELDING INSTITUTE, INC., Columbus, OH (US)

( * ) Notice: Subject to any disclaimer, the term of this patent is extended or adjusted under 35 U.S.C. 154(b) by 0 days.

(21) Appl. No.: 14/979,809

(22) Filed: Dec. 28, 2015

(51) Int. Cl.
| | |
|---|---|
| *B23K 20/00* | (2006.01) |
| *B23K 20/10* | (2006.01) |
| *B06B 3/00* | (2006.01) |
| *G10K 11/00* | (2006.01) |

(52) U.S. Cl.
CPC ............... *B23K 20/106* (2013.01); *B06B 3/00* (2013.01); *B23K 20/103* (2013.01); *G10K 11/004* (2013.01)

(58) Field of Classification Search
CPC ...... B06B 3/00; B23K 20/106; B23K 20/103; G10K 11/004
USPC ......................................... 228/110.1, 1.1, 111
See application file for complete search history.

(56) References Cited

U.S. PATENT DOCUMENTS

2011/0220292 A1* 9/2011 Short ................... B23K 20/103
156/580.1

\* cited by examiner

*Primary Examiner* — Erin Saad
(74) *Attorney, Agent, or Firm* — McNees Wallace & Nurick, LLC

(57) ABSTRACT

An ultrasonic welding apparatus that includes a full-wave sonotrode that further includes a first horn, a first nodal region, a welding surface, a second nodal region, and a second horn; first and second bearing assemblies that support the sonotrode at the first and second nodal regions respectively, wherein each bearing assembly further includes a first bearing housing portion; a first low friction bearing disposed within the first bearing housing portion; a second bearing housing portion connected to the first bearing housing portion; and a second low friction bearing disposed within the second bearing housing portion; a first centering apparatus that exerts laterally-acting force on the horn of the full-wave sonotrode; and a second centering apparatus that exerts laterally-acting force on the second horn of the full-wave sonotrode.

20 Claims, 2 Drawing Sheets

SONOTRODE APPARATUS FOR USE IN ULTRASONIC ADDITIVE MANUFACTURING

BACKGROUND OF THE INVENTION

The described invention relates in general to ultrasonic welding systems and devices and more specifically to a sonotrode apparatus for use in ultrasonic additive manufacturing, wherein the sonotrode apparatus includes certain features that enhance its functionality as compared to prior art systems and devices.

Ultrasonic welding is an industrial process involving high-frequency ultrasonic acoustic vibrations that are locally applied to workpieces being held together under pressure to create a solid-state weld. This process has applications in the electrical/electronic, automotive, aerospace, appliance, and medical industries and is commonly used for plastics and especially for joining dissimilar materials. Ultrasonic welding of thermoplastics results in local melting of the plastic due to absorption of vibration energy. The vibrations are introduced across the joint to be welded. In metals, ultrasonic welding occurs due to high-pressure dispersion of surface oxides and local motion of the materials. Although heating is involved, it is not enough to melt the base materials. Vibrations are introduced along the joint being welded.

Ultrasonic welding systems typically include the following components: (i) a press for applying pressure to the two parts to be assembled; (ii) a nest or anvil where the parts are placed for allowing high frequency vibration to be directed to the interface of the parts; (iii) an ultrasonic stack that includes a converter or piezoelectric transducer for converting the electrical signal into a mechanical vibration, an optional booster for modifying the amplitude of the vibration (it is also used in standard systems to clamp the stack in the press), and a sonotrode or horn for applying the mechanical vibration to the parts to be welded (all three components of the stack are specifically tuned to resonate at the same ultrasonic frequency, which is typically 20, 30, 35 or 40 kHz); (iv) an electronic ultrasonic generator or power supply delivering a high power AC signal with a frequency matching the resonance frequency of the stack; and (v) a controller for controlling the movement of the press and the delivery of the ultrasonic energy.

In an exemplary system, the power supply provides high-frequency electrical power to the piezoelectric-based transducer, creating a high-frequency mechanical vibration at the end of the transducer. This vibration is transmitted through the booster section, which may be designed to amplify the vibration, and is then transmitted to the sonotrode, which transmits the vibrations to the workpieces. The workpieces, which are typically two thin sheets of metal in a simple lap joint, are firmly clamped between the sonotrode and a rigid anvil by a static force. The top workpiece is gripped against the moving sonotrode by a knurled or textured pattern on the sonotrode surface. Likewise, the bottom workpiece is gripped against the anvil by a knurled or textured pattern on the anvil. The ultrasonic vibrations of the sonotrode, which are parallel to the workpiece surfaces, create the relative frictionlike motion between the interface of the workpieces, causing the deformation, shearing, and flattening of surface asperities. Welding system components, commonly referred to as the transmission line or "stack" are typically housed in an enclosure case that grips the welding assembly at critical locations (most commonly the anti-node) so as to not dampen the ultrasonic vibrations, and to provide a means of applying a force to and moving the assembly to bring the sonotrode into contact with the workpieces and apply the static force.

A number of parameters can affect the ultrasonic welding process, such as ultrasonic frequency, vibration amplitude, static force, power, energy, time, materials, part geometry, and tooling. With regard to tooling, which includes the sonotrode, welding tip, and the anvil, these components support the parts to be welded and transmit ultrasonic energy and static force. The welding tip is usually machined as an integral part of a solid sonotrode. The sonotrode is exposed to ultrasonic vibration and resonates in frequency as "contraction" and "expansion" x times per second, with x being the frequency. The amplitude is typically a few micrometers (about 13 to 130 m). The shape of the sonotrode (round, square, with teeth, profiled, etc.), depends on the quantity of vibratory energy and a physical constraint for a specific application. Sonotrodes are typically made of titanium, aluminum or steel. For an ultrasonic welding application, the sonotrode provides energy directly to the welding contact area, with little diffraction, which is particularly helpful when vibrations propagation could damage surrounding components.

Ultrasonic additive manufacturing (UAM) is an additive manufacturing technique based on the ultrasonic welding of metal foils and computer numerically controlled (CNC) contour milling. UAM can also be characterized as a solid-state metal deposition process that allows build-up or net-shape fabrication of metal components. High-frequency (typically 20,000 hertz) ultrasonic vibrations are locally applied to metal foil materials, held together under pressure, to create a solid-state weld. CNC contour milling is then used to create the required shape for the given layer. This process is then repeated until a solid component has been created or a feature is repaired or added to a component. UAM can join dissimilar metal materials of different thicknesses and allow for the embedment of fiber materials at relatively low temperature, (typically <50% of the metal matrix melting temperature) and pressure into solid metal matrices.

Current UAM technology utilizes titanium based tools which tend to wear rapidly, often resulting in a loss of displacement of the target media due to insufficient interaction of worn texture profiles during the ultrasonic welding process. Deflection of the sonotrode and loss of displacement under various forces can significantly affect the bond quality of build-ups of metal components during the UAM process. Incorporation of advanced tool steels into modified sonotrode designs would permit higher, more uniform stress distribution in the system, thereby allowing higher static forces to be applied to advanced materials while retaining critical surface texturing over extended periods of time. Therefore, there was a need for a sonotrode design that assists the UAM welding process by generating higher static forces required for transmitting increased levels of ultrasonic energy useful for producing components that include Ni, Ti, or high speed steel (HSS).

The ultrasonic welding system disclosed in U.S. Pat. No. 8,272,424, which is incorporated by reference herein in its entirety and for all purposes, addresses the needs identified above and provides numerous advantages including: (i) applying compressive forces to the sonotrode at the nodal regions thereof, thereby permitting greater overall delivery of force to the workpieces; (ii) the inclusion of two transducers in a push-pull configuration that permits higher power to be delivered to the workpieces; and (iii) a unique arrangement of springs and linear guides that provide axial alignment ultrasonic components, the ability for the ultrasonic components to spin about the central axis thereof, lateral flexibility for vibrations in the ultrasonic components, and lateral stiffness for lateral alignment of the welding head. Despite being highly effective for its intended purpose, the complex system of springs and bearings utilized by the ultrasonic welding system disclosed in U.S. Pat. No. 8,272,424 creates significant complexity with regard to assembling and aligning the system. Additionally, these springs and bearings add undesirable expense to the system. Accordingly, there is a need for an ultrasonic welding system such as that disclosed in U.S. Pat. No. 8,272,424, but that involves fewer parts and that reduces assembly time and overall expense.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first ultrasonic welding apparatus is provided. This ultrasonic welding apparatus includes full-wave sonotrode; a first bearing assembly; second bearing assembly; a first centering apparatus; and a second centering apparatus. The full-wave sonotrode further includes a first horn; a first nodal region; a welding surface; a second nodal region positioned opposite from the first nodal position; and a second horn positioned opposite from the first horn. The first bearing assembly supports the full-wave sonotrode at the first nodal region and further includes a first bearing housing portion; a first low friction bearing disposed within the first bearing housing portion; a second bearing housing portion connected to the first bearing housing portion; and a second low friction bearing disposed within the second bearing housing portion. The second bearing assembly supports the full-wave sonotrode at the second nodal region and further includes a first bearing housing portion; a first low friction bearing disposed within the first bearing housing portion; a second bearing housing portion connected to the first bearing housing portion; and a second low friction bearing disposed within the second bearing housing portion. The first centering apparatus exerts laterally-acting force on the horn of the full-wave sonotrode; and the second centering apparatus exerts laterally-acting force on the second horn of the full-wave sonotrode.

In accordance with another aspect of the present invention, a second ultrasonic welding apparatus is provided. This ultrasonic welding apparatus includes a first ultrasonic transducer; a second ultrasonic transducer; a full-wave sonotrode positioned between the first ultrasonic transducer and the second ultrasonic transducer; a first bearing assembly; a second bearing assembly; a first centering apparatus; and a second centering apparatus. The full-wave sonotrode includes a first horn; a first nodal region; a welding surface; a second nodal region positioned opposite from the first nodal position; and a second horn positioned opposite from the first horn. The first bearing assembly supports the full-wave sonotrode at the first nodal region and further includes a first bearing housing portion; a first low friction bearing disposed within the first bearing housing portion; a second bearing housing portion connected to the first bearing housing portion; and a second low friction bearing disposed within the second bearing housing portion. The second bearing assembly supports the full-wave sonotrode at the second nodal region and further includes a first bearing housing portion; a first low friction bearing disposed within the first bearing housing portion; a second bearing housing portion connected to the first bearing housing portion; and a second low friction bearing disposed within the second bearing housing portion. The first centering apparatus exerts laterally-acting force on the horn of the full-wave sonotrode; and the second centering apparatus exerts laterally-acting force on the second horn of the full-wave sonotrode.

In yet another aspect of this invention, a third ultrasonic welding apparatus is provided. This ultrasonic welding apparatus includes a mounting plate or surface that further includes a force application region; a first ultrasonic transducer; a second ultrasonic transducer; a full-wave sonotrode positioned between the first ultrasonic transducer and the second ultrasonic transducer; a first bearing assembly connected to the mounting surface; a second bearing assembly connected to the mounting surface; a first centering apparatus connected to the mounting surface; and a second centering apparatus connected to the mounting surface. The full-wave sonotrode includes a first body portion; a first nodal region; a welding surface; a second nodal region positioned opposite from the first nodal position; and a second body portion positioned opposite from the first horn. The first bearing assembly supports the full-wave sonotrode at the first nodal region and further includes a first bearing housing portion; a first low friction bearing disposed within the first bearing housing portion; a second bearing housing portion connected to the first bearing housing portion; and a second low friction bearing disposed within the second bearing housing portion. The second bearing assembly supports the full-wave sonotrode at the second nodal region and further includes a first bearing housing portion; a first low friction bearing disposed within the first bearing housing portion; a second bearing housing portion connected to the first bearing housing portion; and a second low friction bearing disposed within the second bearing housing portion. The first centering apparatus exerts substantially constant laterally-acting force on the first body portion of the full-wave sonotrode; and the second centering apparatus exerts substantially constant laterally-acting force on the second body portion of the full-wave sonotrode.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
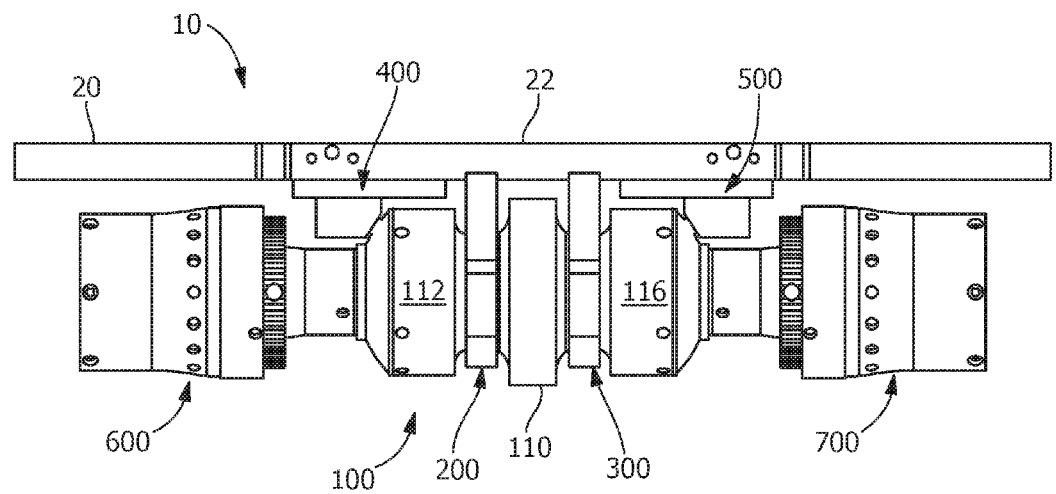
FIG. 1 is a side view of a sonotrode assembly/ultrasonic welding apparatus, in accordance with an exemplary embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 2:
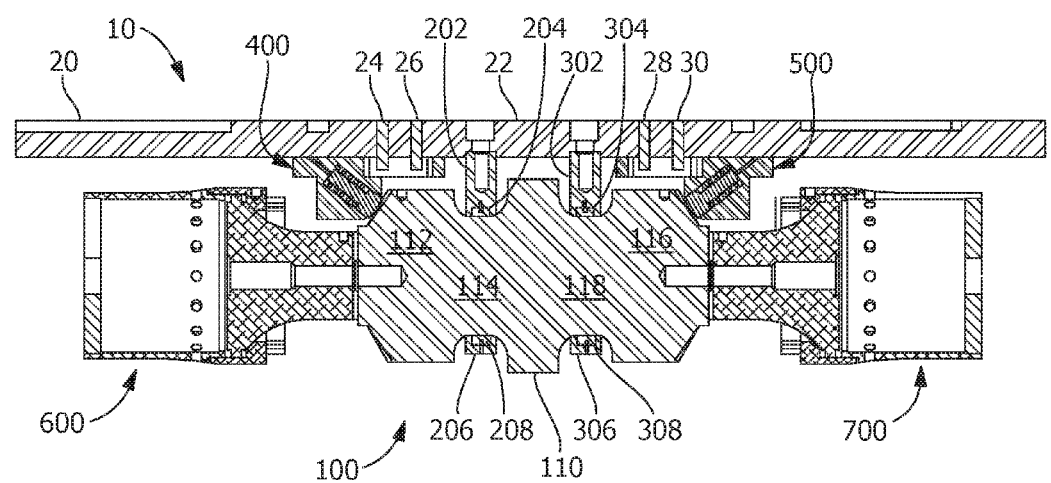
FIG. 2 is a cross-sectional side view of the ultrasonic welding apparatus of FIG. 1.

With reference to the Figures, FIG. 1 provides a side view of an exemplary embodiment of ultrasonic welding apparatus 10 and FIG. 2 provides a cross-sectional side view of this exemplary embodiment of the present invention. As shown in these Figures, ultrasonic welding apparatus 10 includes mounting plate 20; full-wave sonotrode 100; first bearing assembly 200; second bearing assembly 300; first spring assembly 400; second spring assembly 500; first ultrasonic transducer 600; and second ultrasonic transducer 700. First ultrasonic transducer 600 and second ultrasonic transducer 700 provide ultrasonic energy in the form of lateral vibration to full-wave sonotrode 100, which is positioned between first ultrasonic transducer 600 and second ultrasonic transducer 700.

Again with reference to FIGS. 1-2, mounting plate or surface 20 includes force application region 22 to which a pneumatic press is attached for applying downward force to ultrasonic welding apparatus 10; first dowel pin 24; second dowel pin 26; third dowel pin 28; and fourth dowel pin 30. Full-wave sonotrode 100, which is acoustically tuned to ring at a predetermined frequency, includes textured welding surface 110; first body portion 112 (i.e., horn); first nodal region 114; second body portion 116 (i.e., horn); and second nodal region 118. Full-wave sonotrode 100 is supported by first bearing assembly 200 and second bearing assembly 300, both of which are attached to mounting plate 20.

First bearing assembly 200 includes first bearing housing portion 202, which houses first low friction bearing 204 and second bearing housing portion 206, which houses second low friction bearing 208 and which provides for axial alignment. First bearing housing portion 202 is mounted directed to mounting plate 20 for transferring load from first low friction bearing 204 to mounting plate 20. Second bearing housing portion 206 mounts to first bearing housing portion 202 and holds second low friction bearing 208, while supporting full-wave sonotrode 100 in the vertical position. Low friction bearings 204 and 208 permit free rotation of sonotrode 100. Bolts that are used to connect second bearing housing portion 206 to first bearing housing portion 202 are torqued to create consistent friction on the low friction bearings.

Second bearing assembly 300 includes first bearing housing portion 302, which houses first low friction bearing 304 and second bearing housing portion 306, which houses second low friction bearing 308 and which provides for axial alignment. First bearing housing portion 302 is mounted directed to mounting plate 20 for transferring load from first low friction bearing 304 to mounting plate 20. Second bearing housing portion 306 mounts to first bearing housing portion 302 and holds second low friction bearing 308, while supporting full-wave sonotrode 100 in the vertical position. Low friction bearings 304 and 308 permit free rotation of sonotrode 100. Bolts that are used to connect second bearing housing portion 306 to first bearing housing portion 302 are torqued to create consistent friction on the low friction bearings.

Figure 3:
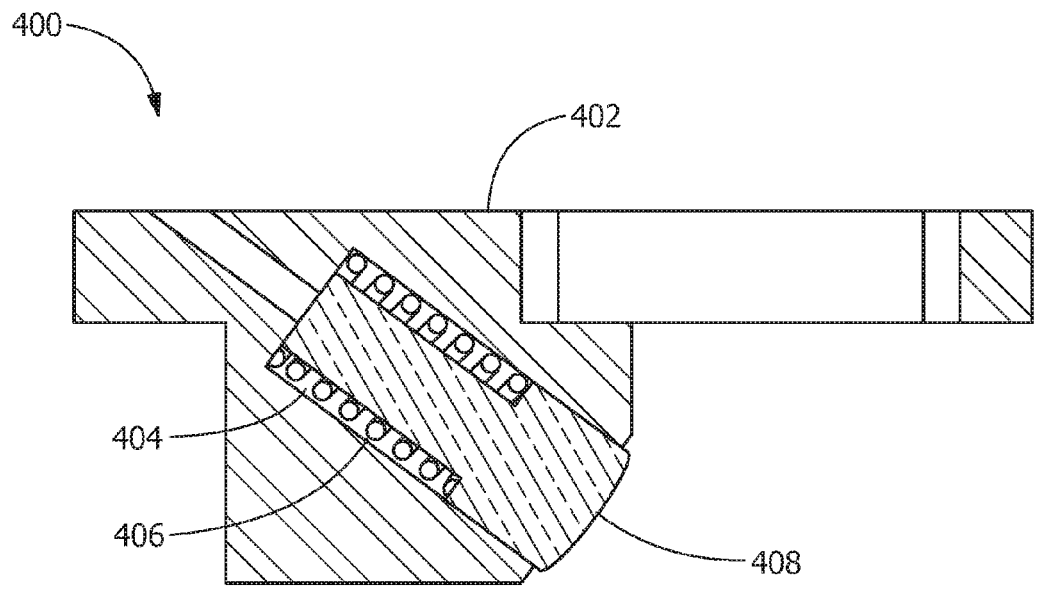
FIG. 3 is a cross-sectional side view of the first spring assembly component of the ultrasonic welding apparatus of FIG. 1.
Figure 4:
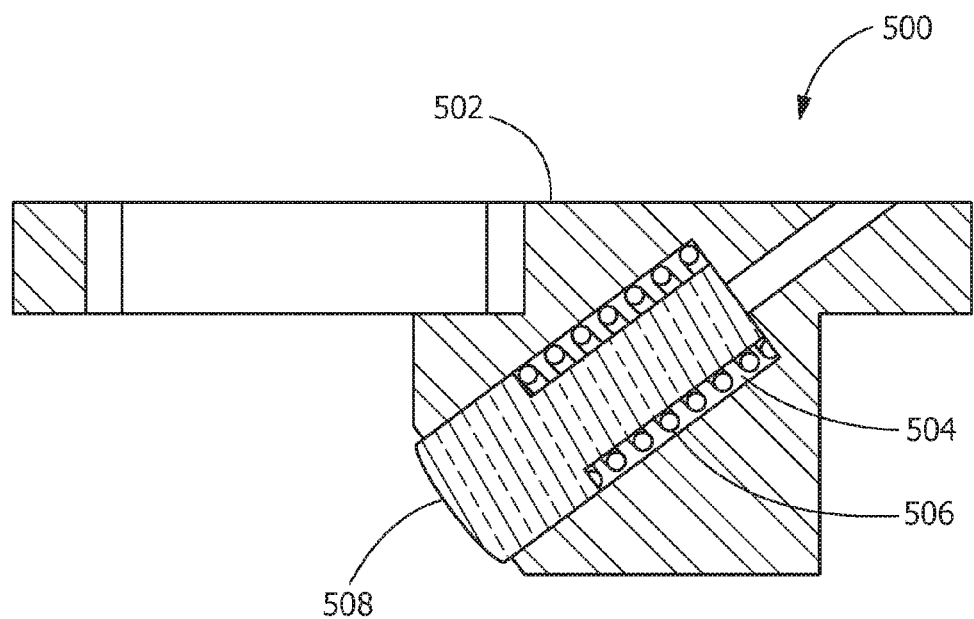
FIG. 4 is a cross-sectional side view of the second spring assembly component of the ultrasonic welding apparatus of FIG. 1.

Full-wave sonotrode 100 is centered laterally by first spring assembly 400 and second spring assembly 500 (see FIGS. 3-4), which provide constant inward force on first body portion 112 and second body portion 116.

First spring assembly 400, which is mounted on first dowel pin 24 and second dowel pin 26, includes body 402; bore 404, which is formed in body 402; biasing member or die spring 406; and plunger 408. Body 402 is typically a machined steel block that is slotted to slide on dowel pins 24 and 26 and includes a hole or aperture for positive location of die spring 406; and plunger 408. High-rate die spring 406 encircles the rear portion of plunger 408 and applies downward and outward force to plunger 408, which then exerts force against first body portion 112 of sonotrode 100 (see FIG. 2). Plunger 408 is typically a machined plunger made from a low friction material such as, for example, oil impregnated bronze that includes a slightly rounded contour on the end thereof that contacts first body portion 112 (i.e., the weld horn). Dowel pins 24 and 26 locate body 402 front to back and permit lateral adjustment thereof. Body 402 is moved side-to-side to preload die spring 406 and after die spring 406 has been preloaded, one or more bolts are used to secure body 402 in place.

Second spring assembly 500, which is mounted on third dowel pin 28 and fourth dowel pin 30, includes body 502; bore 504, which is formed in body 502; biasing member or die spring 506; and plunger 508. Body 502 is typically a machined steel block that is slotted to slide on dowel pins 28 and 30 and includes a hole or aperture for positive location of die spring 506; and plunger 508. High-rate die spring 506 encircles the rear portion of plunger 508 and applies downward and outward force to plunger 508, which then exerts force against second body portion 116 of sonotrode 100 (see FIG. 2). Plunger 508 is typically a machined plunger made from a low friction material such as, for example, oil impregnated bronze that includes a slightly rounded contour on the end thereof that contacts first body portion 116 (i.e., the weld horn). Dowel pins 28 and 30 locate body 502 front to back and permit lateral adjustment thereof. Body 502 is moved side-to-side to preload die spring 506 and after die spring 506 has been preloaded, one or more bolts are used to secure body 502 in place.

The constant spring-driven force provided by first spring assembly 400 and second spring assembly 500 keeps sonotrode 100 laterally centered while still permitting high frequency vibrations (e.g., 30-50 microns in the lateral direction) within the sonotrode. This design permits alignment of welding surface 110 within the center of welding apparatus 10 such that the foil tape workpieces that are used in UAM applications are consistently located under the textured area of welding surface 110.

While the present invention has been illustrated by the description of exemplary embodiments thereof, and while the embodiments have been described in certain detail, it is not the intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:
1. An ultrasonic welding apparatus, comprising:
   (a) a full-wave sonotrode, wherein the full-wave sonotrode includes:
       (i) a first horn;
       (ii) a first nodal region;

(iii) a welding surface;
(iv) a second nodal region positioned opposite from the first nodal region; and
(v) a second horn positioned opposite from the first horn;
(b) a first bearing assembly, wherein the first bearing assembly supports the full-wave sonotrode at the first nodal region; and wherein the first bearing assembly further includes:
(i) a first bearing housing portion;
(ii) a first low friction bearing disposed within the first bearing housing portion;
(iii) a second bearing housing portion connected to the first bearing housing portion; and
(iv) a second low friction bearing disposed within the second bearing housing portion,
  a) wherein the first and second low friction bearings are operative to allow the full-wave sonotrode to rotate freely, and
  b) wherein the second bearing housing portion is operative to provide axial alignment of the full-wave sonotrode within the ultrasonic welding apparatus;
(c) a second bearing assembly, wherein the second bearing assembly supports the full-wave sonotrode at the second nodal region, and wherein the second bearing assembly further includes:
(i) a first bearing housing portion;
(ii) a first low friction beating disposed within the first bearing housing portion;
(iii) a second bearing housing portion connected to the first bearing housing portion; and
(iv) a second low friction bearing disposed within the second bearing housing portion,
  a) wherein the first and second low friction bearings are operative to allow the full-wave sonotrode to rotate freely, and
  b) wherein the second bearing housing portion is operative to provide axial alignment of the full-wave sonotrode within the ultrasonic welding apparatus;
(d) a first centering apparatus wherein the first centering apparatus exerts laterally-acting force on the horn of the full-wave sonotrode; and
(e) a second centering apparatus, wherein the second centering apparatus exerts laterally-acting force on the second horn of the full-wave sonotrode.

2. The ultrasonic welding apparatus of claim 1, wherein the sonotrode is acoustically tuned to ring at a predetermined frequency.

3. The ultrasonic welding apparatus of claim 1, wherein the first centering apparatus further comprises:
(a) body;
(b) a bore formed within the body;
(c) a plunger disposed within the body; and
(d) a biasing member circumferentially disposed around the plunger.

4. The ultrasonic welding apparatus of claim 3, wherein the biasing member is a die spring.

5. The ultrasonic welding apparatus of claim 3, wherein the plunger is machined from a low friction material, and wherein the low friction material includes oil impregnated bronze.

6. The ultrasonic welding apparatus of claim 1; wherein the second centering apparatus further comprises:
(a) body;
(b) a bore formed within the body;
(c) a plunger disposed within the body; and
(d) a biasing member circumferentially disposed around the plunger.

7. The ultrasonic welding apparatus of claim 6, wherein the biasing member is a die spring.

8. The ultrasonic welding apparatus of claim 6, wherein the plunger is machined from a low friction material, and wherein the low friction material includes oil impregnated bronze.

9. An ultrasonic welding apparatus, comprising:
(a) a first ultrasonic transducer;
(b) a second ultrasonic transducer;
(c) a full-wave sonotrode positioned between the first ultrasonic transducer and the second ultrasonic transducer, wherein the full-wave sonotrode includes:
(i) a first horn;
(ii) a first nodal region;
(iii) a welding surface;
(iv) a second nodal region positioned opposite from the first nodal region; and
(v) a second horn positioned opposite from the first horn;
(d) a first bearing assembly, wherein the first bearing assembly supports the full-wave sonotrode at the first nodal region, and wherein the first bearing assembly further includes:
(i) a first bearing housing portion;
(ii) a first low friction bearing disposed within the first bearing housing portion;
(iii) a second bearing housing portion connected to the first bearing housing portion; and
(iv) a second low friction bearing disposed within the second bearing housing portion,
  a) wherein the first and second low friction bearings are operative to allow the full-wave sonotrode to rotate freely, and
  b) wherein the second bearing housing portion is operative to provide axial alignment of the full-wave sonotrode within the ultrasonic welding apparatus;
(e) a second bearing assembly, wherein the second bearing assembly supports the full-wave sonotrode at the second nodal region, and wherein the second bearing assembly further includes:
(i) a first bearing housing portion;
(ii) a first low friction bearing disposed within the first bearing housing portion;
(iii) a second bearing housing portion connected to the first bearing housing portion; and
(iv) a second low friction bearing disposed within the second bearing housing portion,
  a) wherein the first and second low friction bearings are operative to allow the full-wave sonotrode to rotate freely, and
  b) wherein the second bearing housing portion is operative to provide axial alignment of the full-wave sonotrode within the ultrasonic welding apparatus;
(f) a first centering apparatus wherein the first centering apparatus exerts laterally-acting force on the horn of the full-wave sonotrode; and
(g) a second centering apparatus, wherein the second centering apparatus exerts laterally-acting force on the second horn of the full-wave sonotrode.

10. The ultrasonic welding apparatus of claim 9, wherein the sonotrode is acoustically tuned to ring at a predetermined frequency.

11. The ultrasonic welding apparatus of claim 9, wherein the first centering apparatus further comprises:
(a) body;
(b) a bore formed within the body;
(c) a plunger disposed within the body; and
(d) a biasing member circumferentially disposed around the plunger.

12. The ultrasonic welding apparatus of claim 11, wherein the biasing member is a die spring.

13. The ultrasonic welding apparatus of claim 11, wherein the plunger is machined from a low friction material, and wherein the low friction material includes oil impregnated bronze.

14. The ultrasonic welding apparatus of claim 9, wherein the second centering apparatus further comprises:
(a) body;
(b) a bore formed within the body;
(c) a plunger disposed within the body; and
(d) a biasing member circumferentially disposed around the plunger.

15. The ultrasonic welding apparatus of claim 14, wherein the biasing member is a die spring.

16. The ultrasonic welding apparatus of claim 14, wherein the plunger is machined from a low friction material, and wherein the low friction material includes oil impregnated bronze.

17. An ultrasonic welding apparatus, comprising:
(a) a mounting surface, wherein the mounting surface includes a force application region;
(b) a first ultrasonic transducer;
(c) a second ultrasonic transducer;
(d) a full-wave sonotrode positioned between the first ultrasonic transducer and the second ultrasonic transducer, wherein the full-wave sonotrode includes:
  (i) a first body portion;
  (ii) a first nodal region;
  (iii) a welding surface;
  (iv) a second nodal region positioned opposite from the first nodal region; and
  (v) a second body portion positioned opposite from the first body portion;
(e) a first bearing assembly, wherein the first bearing assembly is connected to the mounting surface; wherein the first bearing assembly supports the full-wave sonotrode at the first nodal region, and wherein the first bearing assembly further includes:
  (i) a first bearing housing portion;
  (ii) a first low friction beating disposed within the first beating housing portion;
  (iii) a second bearing housing portion connected to the first bearing housing portion; and
  (iv) a second low friction bearing disposed within the second bearing housing portion,
    a) wherein the first and second low friction bearings are operative to allow the full-wave sonotrode to rotate freely, and
    b) wherein the second bearing housing portion is operative to provide axial alignment of the full-wave sonotrode within the ultrasonic welding apparatus;
(f) a second bearing assembly, wherein the second bearing assembly is connected to the mounting surface, wherein the second bearing assembly supports the full-wave sonotrode at the second nodal region; and wherein the second bearing assembly further includes:
  (i) a first bearing housing portion;
  (ii) a first low friction bearing disposed within the first bearing housing portion;
  (iii) a second bearing housing portion connected to the first bearing housing portion; and
  (iv) a second low friction bearing disposed within the second bearing housing portion,
    a) wherein the first and second low friction bearings are operative to allow the full-wave sonotrode to rotate freely, and
    b) wherein the second bearing housing portion is operative to provide axial alignment of the full-wave sonotrode within the ultrasonic welding apparatus;
(g) a first centering apparatus connected to the mounting surface, wherein the first centering apparatus exerts substantially constant laterally-acting force on the first body portion of the full-wave sonotrode; and
(h) a second centering apparatus connected to the mounting surface, wherein the second centering apparatus exerts substantially constant laterally-acting force on the second body portion of the full-wave sonotrode.

18. The ultrasonic welding apparatus of claim 17, wherein the sonotrode is acoustically tuned to ring at a predetermined frequency.

19. The ultrasonic welding apparatus of claim 17, wherein the first and second centering apparatuses each further comprise:
(a) body;
(b) a bore formed within the body;
(c) a plunger disposed within the body; and
(d) a biasing member circumferentially disposed around the plunger.

20. The ultrasonic welding apparatus of claim 19, wherein the biasing member is a die spring, wherein the plunger is machined from a low friction material, and wherein the low friction material includes oil impregnated bronze.

* * * * *